Figure 1:
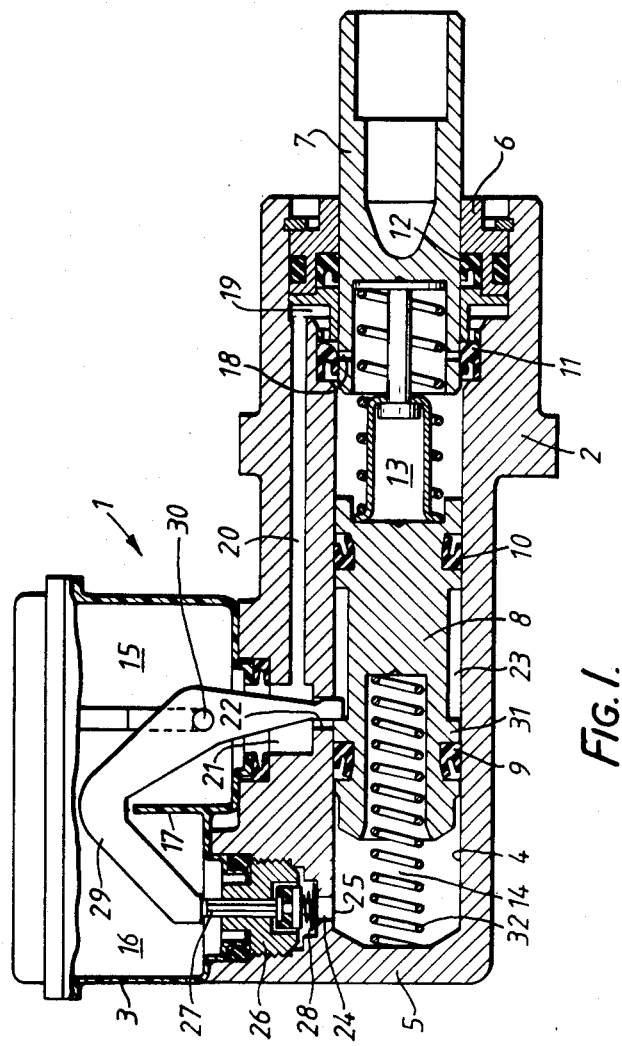

United States Patent [19]

Farr

[11] Patent Number: 4,688,382

[45] Date of Patent: Aug. 25, 1987

[54] HYDRAULIC MASTER CYLINDER

[75] Inventor: Glyn P. R. Farr, Leek Wootton, England

[73] Assignee: Lucas Industries Public Limited Company, Birmingham, England

[21] Appl. No.: 781,879

[22] Filed: Sep. 30, 1985

[30] Foreign Application Priority Data

Oct. 4, 1984 [GB] United Kingdom ............... 8425106

[51] Int. Cl.4 ........................................... B60T 11/20
[52] U.S. Cl. ....................................... 60/562; 60/589
[58] Field of Search ................. 60/562, 589, 592, 585

[56] References Cited

U.S. PATENT DOCUMENTS

| | | | |
|---|---|---|---|
| 2,282,390 | 5/1942 | Baisch | 60/589 |
| 2,657,537 | 11/1953 | Oakley | 60/589 |
| 3,044,268 | 7/1962 | Harrison | 60/589 |
| 4,152,897 | 5/1979 | Falk | 60/589 |
| 4,407,121 | 10/1983 | Crumb | 60/589 |
| 4,483,145 | 11/1984 | Takeuchi | 60/589 |

FOREIGN PATENT DOCUMENTS 410243  5/1934  United Kingdom ................. 60/589

Primary Examiner—Abraham Hershkovitz
Attorney, Agent, or Firm—Scrivener and Clarke

[57] ABSTRACT

A short hydraulic master cylinder includes a secondary pressure chamber recuperation valve assembly which is mounted in the side of the master cylinder body and incorporates a center valve operable by a lever which engages the rear surface of the front seal support flange of the secondary piston. Thus, the portion of the secondary chamber defined by the master cylinder bore is devoid of all valve and operating linkage components. Recuperation flow to the primary chamber is via a center valve assembly connected by bores to the space between the seals of the secondary piston, and the passage through which the lever extends.

3 Claims, 4 Drawing Figures

FIG.I.

HYDRAULIC MASTER CYLINDER

This invention relates to a hydraulic master cylinder, and more particularly to a so-called "tandem" master cylinder in which two pistons are arranged in a common bore and pressurise separate primary and secondary pressure chambers which are connected to respective use circuits. Such master cylinders are commonly used in split circuit hydraulic brake systems of motor cars.

A typical tandem master cylinder is shown in published British patent application GB No. 2030668A. Whilst such master cylinders work effectively they tend to be of considerable length which creates difficulties in housing the master cylinder in a motor car, and are of considerable weight, which is undesirable.

As will be appreciated by those skilled in the art, it is of assistance in designing a tandem master cylinder having a shorter length than that shown in GB No. 2030668A if the normally open recuperation passage associated with the secondary pressure chamber opens into the secondary pressure chamber at the end thereof remote from the secondary piston. However, if the recuperation passage is placed at the end of the secondary pressure chamber remote from the secondary piston a valve arrangement must be provided for closing the recuperation passage during pressure generating strokes of the master cylinder, and a linkage must be provided to operate such valve, the linkage extending from the valve to the secondary piston. Arrangements of this type are shown in British patent specification GB No. 1289608A and published British patent application No. 2135412A. These prior art proposals suffer from a number of disadvantages.

In the case of GB No. 2135412 the valve seat is directly machined on the internal end face of the master cylinder body assembly. Such machining is difficult to achieve with accuracy, and necessitates the provision of a connecting passage located within the thickness of the end wall of the master cylinder. This unnecessarily adds to the length and weight of the master cylinder. This problem is in part overcome in GB No. 1289608A since the recuperation passage is formed in the side-wall of the master cylinder, and the valve seat is formed on a separate end plug. However, it will be appreciated that the valve seat must be machined accurately over a relatively large area, and in particular must be exactly perpendicular to the master cylinder axis in order to ensure reliable sealing. Further the valve seat is particularly vulnerable to damage, e.g. by scratching, if the end plug is removed.

The prior art suffers from the further disadvantage that the moving components of the recuperation valve, together with the associated springs and control linkage, are located within the portion of the main bore of the master cylinder which forms the secondary pressure chamber. This leads to three separate problems: firstly, the length of the secondary pressure chamber is liable to be increased by the need to house such components; secondly, since such components are located deep in the bore they render assembly of the master cylinder more difficult; and thirdly, since the movable member of the recuperation valve will have only minimal travel, lost motion between the secondary piston and the valve operating linkage must be provided for within the portion of the bore of the master cylinder which forms the secondary chamber. These problems are solved in the prior art by means of complex machining of the master cylinder bore and/or the use of a master cylinder body fabricated from a number of separate components. This is, of course, undesirable.

Accordingly, one aspect of the present invention provides a hydraulic master cylinder comprising: a body having a bore which is closed at one end; primary and secondary pistons located in the bore; a primary pressure chamber connectable to a first use circuit and formed, at least in part, by the portion of the bore located between the primary and secondary pistons; a secondary pressure chamber connectable to a second use circuit and formed, at least in part, by the portion of the bore located between the secondary piston and the closed end of the bore; a recuperation passage extending from the bore adjacent the closed end thereof to a hydraulic reservoir; a valve for closing said passage during pressure generating strokes of the master cylinder; and a mechanical connection linking the valve to the secondary piston for controlling the opening and closing of the valve, wherein the valve and the mechanical connection are located externally of that portion of the bore which forms at least part of the secondary pressure chamber.

By locating the recuperation valve and its associated operating linkage externally of that portion of the bore which forms at least part of the secondary pressure chamber the disadvantages of the prior art outlined above may be overcome. In particular, the recuperation passage may enter the bore as a simple port located in the side wall of the bore adjacent the end wall. No special machining techniques are required to produce such a port. The recuperation valve itself can then be mounted in the valve body to one side of the bore, thereby obviating the necessity to locate the valve member within the bore.

The lost motion connection between the movable member of the recuperation valve and the secondary piston can be provided for externally of the secondary pressure chamber. These features enable a particularly simple construction of master cylinder to be used, and in particular in the preferred embodiment allow the use of a simple one-piece cast master cylinder body having a simple smooth cylindrical bore.

In the preferred embodiment of the invention the recuperation passage enters the bore at the point which is uppermost when the master cylinder is in its normal operating orientation. Since, in general, a master cylinder is located in a motor vehicle either horizontally, or slopping upwardly from the open end of the master cylinder to the closed end, the recuperation passage preferably enters the bore adjacent the closed end of the master cylinder and on the side of the bore adjacent the reservoir. With this arrangement, air bubbles tending to accumulate at the highest point of the secondary pressure chamber will automatically be bled to the reservoir when the recuperation valve is open.

In a particularly preferred embodiment of the invention the mechanical connection between the secondary piston and the recuperation valve is in the form of a lever located substantially within the reservoir of the master cylinder. Conveniently, the end of the lever projects into the master cylinder bore and is engaged by a rearwardly facing flange of the secondary piston in the normal rest position of the master cylinder. The force imposed on the lever by the secondary piston holds the recuperation valve open. When the secondary piston moves forward during pressure generating strokes force on the lever is released and the recuperation valve is spring closed. If the secondary piston carries a pair of spaced apart seals, the end of the lever can advantageously be located between the seals, and the flange which engages the lever may be the support flange of the front seal of the secondary piston. In this way the lost motion required between the lever and the secondary piston is provided by the space between the secondary piston seal support flanges. Since this space must, in any event, be provided to ensure the two pressure chambers are separated by a reservoir chamber, its use to accommodate lost motion is particularly desirable since it obviates the need to make any special provision for this purpose. Thus, the amount of machining needed is reduced, and the design generally simplified.

In a particularly preferred arrangement the space between the secondary piston seals is connected to that portion of the reservoir associated with the primary pressure chamber. In this case, the operating lever can conveniently be in the form of a pivoted bell-crank arrangement which extends from the bore through the portion of the reservoir associated with the primary pressure chamber, over the internal baffle of the reservoir and into the portion of the reservoir associated with the secondary pressure chamber for engagement with the recuperation valve. This arrangement may be further improved if the space between the two seals is connected to a recuperation valve housed within the secondary piston for supplying recuperation flow to the primary pressure chamber. This not only provides a simple means of allowing for recuperation flow to the primary pressure chamber, but offers the further advantage that only a single seal need be provided for the primary piston, as opposed to the two seals usually provided. The single primary piston seal is preferably mounted on the primary piston, thereby allowing a simple cylindrical master cylinder bore to be used and ensuring that the primary piston seal always runs on a wet surface during a pressure generating stroke.

The, or each, recuperation valve is preferably in the form of a centre valve having an axially movable valve member incorporating an elastomeric seal for engaging the face of an associated valve seat.

Figure 2:
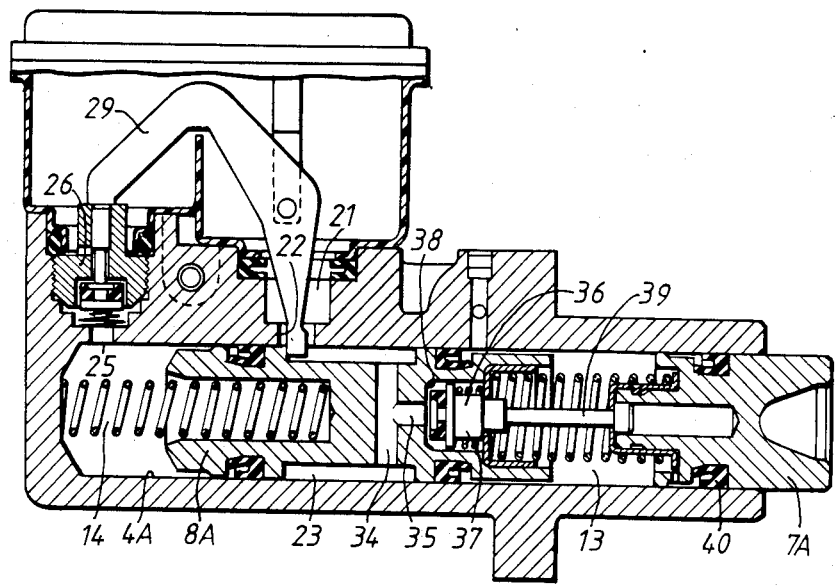
Figure 3:
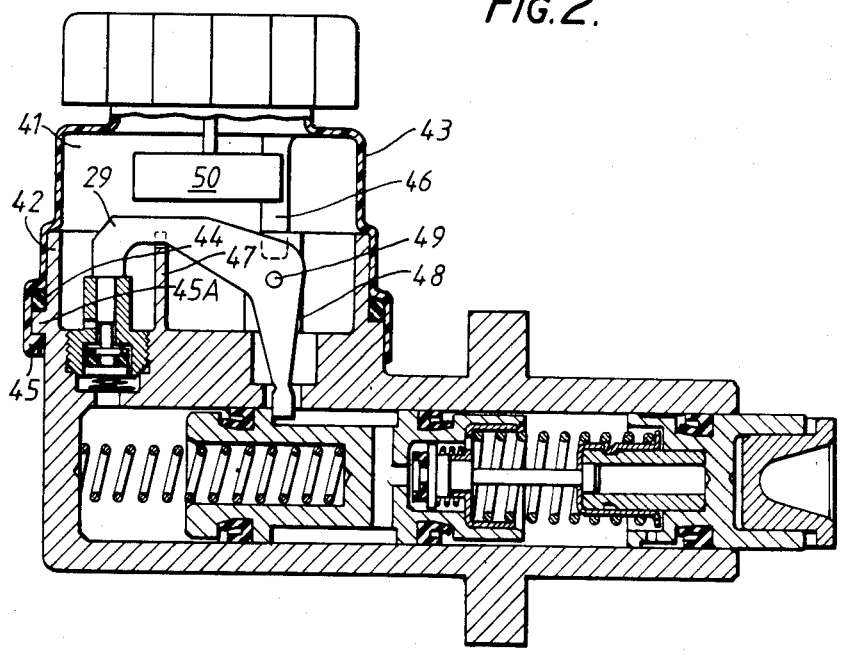
Figure 4:
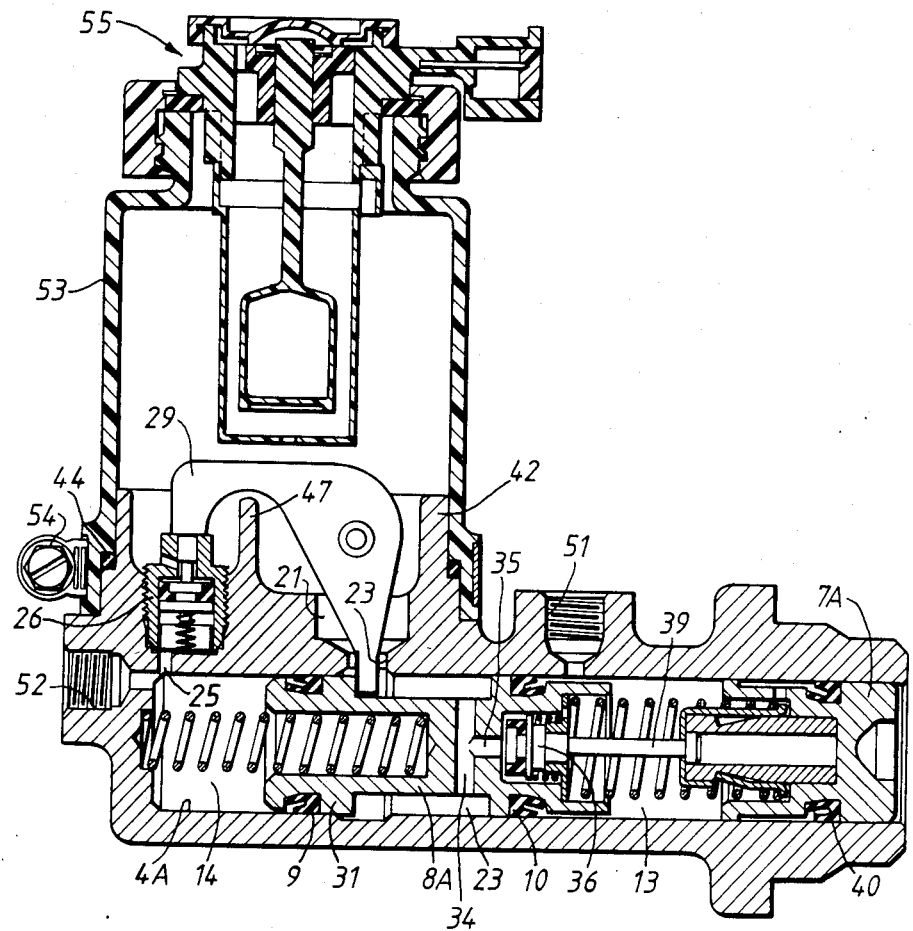

The above and other features and advantages of the invention will become clear from the following description of preferred embodiments thereof given by way of example only, reference being had to the accompanying drawings wherein:

FIG. 1 illustrates an axial cross-section of a first embodiment of the invention and FIGS. 2-4 are views corresponding to FIG. 1 of second, third and fourth embodiments of the invention.

Referring firstly to FIG. 1 there is shown a tandem master cylinder 1 including a unitary cast body 2 to which is secured a moulded plastics reservoir 3. The body is formed with a smooth cylindrical bore 4 over the majority of its length. The bore is closed at one end by a wall 5 and at the other, open end is stepped outwardly to receive a seal and closure assembly 6. A primary piston 7 is slidably received by the assembly 6, and a secondary piston 8 is slidably mounted in the bore 4. The secondary piston has mounted thereon pressure seals 9,10 whilst the primary piston 7 slides through a pressure seal 11 and an atmospheric seal 12 secured to the body 2.

A primary pressure chamber 13 is defined between the primary piston 7 and secondary piston 8, and a secondary pressure chamber 14 is defined between the end wall 5 and the secondary piston 8. Outlet connections (not shown) are provided to connect the chambers 13,14 to respective brake circuits. As will be well understood by those skilled in the art the master cylinder 1 is effective to pressurise either circuit in the event of failure on the other circuit, but under normal circumstances provides equal pressure to each circuit.

The reservoir 3 is divided into a first portion 15 associated with the primary pressure chamber and a second portion 16 associated with the secondary pressure chamber by a central baffle 17. When the master cylinder is in the illustrated rest position the primary chamber 13 is connected to the reservoir portion 15 by way of radial ports 18 formed in the primary piston 7, a passage 19 defined within the assembly 6, a passage 20 defined in the valve body, and a chamber 21 formed in the master cylinder body at the base of the reservoir portion 15. A radial passage 22 connects the chamber 21 to the bore 2 in the zone 23 located between seals 9,10. It will be appreciated that at the commencement of a pressure generating stroke the primary piston 7 moves forward to isolate ports 18 from the passage 19, and accordingly the normally open recuperation passage is closed.

A recuperation passage between the secondary pressure chamber 14 and the reservoir portion 16 is provided by a recuperation passage 24 which extends from a port 25 in the wall of the bore 4 through a centre valve assembly 26 to the reservoir portion 16. The centre valve assembly 26 includes a valve member 27 which is biased by a valve spring 28 towards a closed position, but which in the normal rest position of the master cylinder is held open by a lever 29.

The lever 29 is mounted for pivotal movement about an axis 30, and extends through the chamber 21 and port 22 into the region 23 of the bore 4. In the illustrated rest position the end of the lever 29 located in the bore portion 23 is engaged by a flange 31 of the secondary piston. Since the secondary piston 8 is biased to the right (as viewed) in FIG. 1) by a return spring 32, the lever 29 is biased anti-clockwise about pivot axis 30 to hold the valve member 27 clear of its associated seat and thus provide an open recuperation passage extending from the secondary chamber 14. Upon commencement of a pressure generating stroke the secondary piston 8 advances to relieve the force applied to the lever 29, thereby allowing the lever to be pivoted clockwise as the return spring 28 moves the valve member 27 into its closed position.

It will be noted that the bore of the secondary chamber 14 houses no components whatsoever of the valve assembly 26 or associated operating lever 29. Thus, there is no necessity to assemble complex or small components within the chamber 14, and there are no such components impeding the stroke movement of the secondary piston 8. Accordingly, the overall length of the secondary chamber 14 can be reduced to the minimum required to provide adequate stroke movement for the piston 8. Further, the interior surface of the end wall 5 does not require machining. In fact, the use of a self contained centre valve assembly 26 as illustrated in the drawing means that the only machining of the body necessary to provide a recuperation valve is the formation of a threaded passage for mounting the assembly 26, and even this minimal machining can readily be accomplished since the area to be machined is readily accessible to the exterior of the casting.

It will further be noted that the port 25 is located closely adjacent the end wall 5 and on the side of the bore 4 which is normally uppermost (by virtue of the necessity to have the reservoir upright). Thus, if the master cylinder is located in the usual orientation, i.e. sloping somewhat upwards from right to left as viewed in FIG. 1), any bubbles of air accumulating at the highest point of the secondary chamber 14 will automatically be led to the reservoir 3.

A further advantage of the master cylinder shown in FIG. 1 lies in the fact that the diameter of the primary piston 7 is very slightly less than the diameter of the bore 4. This enables the service outlet passage from the primary chamber 13 to be located adjacent the pressure seal 11 since, even as the primary piston 7 advances to the point at which it overlies the service outlet, an annular passage will still be defined connecting the service outlet to the main part of the primary chamber 13, the annular passage being formed between the bore 4 and the external surface of the primary piston 7. This arrangement is particularly advantageous since it allows the spacing between the seals 10 and 11 (when the master cylinder is in the rest condition) to be reduced to less than the full stroke of the primary piston 7. In effect, because the outlet from the primary pressure chamber 13 is located as described above, the primary piston 7 can, in its fully advanced position, in part occupy the zone which in the rest condition of the master cylinder is located adjacent to or forward of the seal 10. This contrast with the arrangement of, for example, GB No. 2030668A in which the primary piston cannot advance into a zone of the master cylinder bore previously occupied by the secondary piston rear seal because of the service outlet port from the primary pressure chamber. Even if such service outlet port were to be located close to the rear seal of the secondary piston in the arrangement illustrated in GB No. 2030668A the forward movement of the primary piston is limited by the need to keep the service outlet port forwardly of the front seal on the primary piston.

The combined effect of the proposals outlined above is to enable a particularly compact master cylinder to be produced as will be clearly visible from a comparison of FIG. 1 of the present application with FIG. 1 of GB No. 2030668A.

Referring now to FIG. 2 the recuperation valve assembly 26 and operating lever 29, together with the associated secondary pressure chamber 14 are substantially identical to the arrangements described in FIG. 1 and will not be described again in detail. However, in the FIG. 2 arrangement the recuperation passage associated with the primary chamber 13 is provided by means of a cross passage 34 provided in the secondary piston, an axial passage 35 provided in the secondary piston, and a centre valve arrangement 36 comprising a valve member 37 which engages a seat 38 formed on the secondary piston 8A. The valve member 37 is linked to the primary piston 7A by a headed stud 39 whereby the centre valve 36 is held open when the master cylinder is in the rest configuration, thereby defining a recuperation path for the primary chamber 13 via valve assembly 36, passage 35, passage 34, bore zone 23, passage 22, and chamber 21.

It will also be noted that in FIG. 2 the body bore 4A is of uniform cross-section throughout its length, the primary piston 7A being of equal diameter to the secondary piston 8A. Thus, complex machining of the bore 4 is totally eliminated, and aside from forming a smooth cylindrical bore of uniform diameter the only machining required associated with the bore is to form the radial ports 22 and 25, and the service outlet passages associated with the primary and secondary chambers.

Finally, it will be noted that in FIG. 2 only a single seal 40 is provided on the primary piston 7A. This considerably shortens the length of the piston and is possible because the valve assembly 36 obviates the need to provide two seals for the primary piston as required in conventional designs of the type shown in GB No. 2030668A. Because the seal 40 is mounted on the piston, it always runs on a surface wet with brake fluid during pressure generating strokes which, as will be well understood, is desirable.

FIG. 3 shows a third embodiment of the invention which is in large part similar to the embodiment of FIG. 2. However, in FIG. 3 the reservoir 41 is in part defined by an annular wall 42 integral with the body casting, and in part defined by a moulded plastics cover 43 which is a push-fit over the wall 42. An O-ring seal 44 seals between the wall 42 and cover 43, and the normal fluid level is above the top of the wall 42. The cover 43 is held in position by one or more clips 45 which engage under bosses 45A on the body casting. If, as is preferred, the wall 42 is a right circular cylinder, the cover 43 preferably includes a clip 46 which extends from the cover into engagement with the body to prevent rotation of the cover relative to the body.

The wall 47 which divides the reservoir into primary and secondary portions is integral with the body casting as are one or more supports 48 which carry a pin 49 by means of which the lever 29 is rotatably mounted.

The cover 43 is preferably translucent permitting the brake fluid level to be seen, and preferably carries the conventional marks indicating maximum and minimum permitted fluid levels. A fluid level warning indicator 50 is preferably included. It will be appreciated that the cover 43 may be designed to be an internal push-fit within the wall 42 under some circumstances. The above described reservoir arrangement may be of more general application than to the particular master cylinder shown.

Finally, FIG. 4 shows a practical embodiment of the invention which is operationally identical to the embodiment of FIG. 3. FIG. 4, however, illustrates suitable practical outlet connections 51,52 to connecting use circuits to the primary 13 and secondary 14 chambers respectively. Also, the reservoir 53 of FIG. 4 is somewhat different from that of FIG. 3 in that the retaining clips 45 and associated bases 45A have been omitted, and the reservoir 53 is retained on the annular wall 42 by a worm-drive clamp 54. The reservoir 53 is taller than that of FIG. 3 to give a larger reserve of fluid, and incorporates a modified fluid level warning indicator 55 to provide both mechanical and electrical warning of low fluid level.

What is claimed is:

1. A hydraulic master cylinder comprising: a body having a bore which is closed at one end; primary and secondary pistons located in the bore; first seal means for providing a seal between the bore and the primary piston; second seal means mounted on the secondary piston for providing a seal between the bore and the secondary piston at the end of the secondary piston which is nearer the primary piston; third seal means mounted on the secondary piston for providing a seal between the bore and the secondary piston at the end of the secondary piston which is nearer the closed end of the bore; a primary pressure chamber connectable to a first use circuit and formed, at least in part, by the portion of the bore located between the first and second seal means; a secondary pressure chamber connectable to a second use circuit and formed, at least in part, by the portion of the bore located between the third seal means and the closed end of the bore; a hydraulic fluid reservoir mounted on the body, the reservoir including a primary portion and a secondary portion separated from each other by a baffle; a first passage connecting the portion of the bore located between the second and third seal means to the primary portion of the reservoir; a second passage extending from the bore adjacent the closed end thereof to the secondary portion of the reservoir; a valve for closing said second passage during pressure generating strokes of the master cylinder; and a mechanical connection linking the valve to the secondary piston for controlling the opening and closing of the valve, wherein the valve and the mechanical connection are located externally of that portion of the bore which forms at least part of the secondary pressure chamber, and the mechanical connection comprises a lever which extends from the valve through the secondary portion of the reservoir, over the baffle, through the primary portion of the reservoir and through the first passage to the zone of the bore located between the second and third seal means for engaging the secondary piston in said zone.

2. A hydraulic master cylinder according to claim 1 wherein the body is formed with a cylindrical wall which forms the base of the reservoir, and the upper part of the reservoir is formed by a plastics moulding which telescopically engages the cylindrical wall and is sealed thereto by an annular seal, the lever being pivoted on a portion of the body located within the cylindrical wall.

3. A hydraulic master cylinder according to claim 1 wherein the first passage is part of a recuperation passage associated with the primary pressure chamber.

* * * * *